United States Patent Office 3,073,705
Patented Jan. 15, 1963

3,073,705
PROCESS FOR THE PREPARATION OF
SMOKED MEAT PRODUCTS
Eugene J. Rivoche, Washington, D.C., assignor to Rivark
Research and Development Corporation, a corporation
of Indiana
No Drawing. Filed Nov. 9, 1960, Ser. No. 68,150
14 Claims. (Cl. 99—229)

This invention relates to a process for the preparation of smoked meat products, including whole meat cuts such as bacon slabs, hams, picnics, etc., as well as sausage products which are usually smoked in casings, such as wieners, bolognas and the like.

The objects of the invention are to provide improvements in the processing of products of the type described, resulting in reduction of smoking and cooking shrink, reduction in storage shrink, less rendering and fat migration during cooking and smoking, substantial elimination of fat pockets and other defects caused by migration of fat and gelation during cooking and smoking, and in a generally improved product.

These objects and the advantages therefrom are accomplished by the incorporation of a small amount of a non-ionic alkyl ether of cellulose in the meat product prior to the cooking and smoking stage. The invention resides in the discovery of the improvements accomplished by this step, as well as in the specific manner in which the alkyl ether of cellulose is placed in the products. Thus, in the preparation of sausage type products, the alkyl ether of cellulose is introduced in solution form in the meat-grinding stage where the cold solution facilitates cooling of the product being ground. The alkyl ether of cellulose may be dissolved in the water utilized for the production of ice which is normally utilized in such cooling operation. Further, the desired quantity of alkyl ether of cellulose advantageously may be incorporated with dry milk solids normally forming an ingredient of frankfurter mixtures and other sausage mixtures, and the dried milk-cellulose ether mixture dissolved in water to be added to the frankfurter emulsion during the grinding stage. In areas in which fresh liquid whole milk, skim milk or whey are more readily available than the dry milk products, such liquid may advantageously be used in lieu of water in making up milk-methyl cellulose solutions, but the same solubilizing technique as used with water will be necessary.

It has already been disclosed in my copending application Serial No. 21,103, filed April 11, 1960, now abandoned, that non-ionic alkyl ethers of cellulose, which are difficult to dissolve, may be readily placed in solution by mixing with water-soluble dry milk products such as dry milk (whole or fat free), or whey, prior to introduction into water. By this means, the cellulose ether rapidly goes into solution in cold water—almost instantly—whereas when alkyl ethers of cellulose are solubilized in water alone, the easiest way is to disperse the cellulose powders in hot water, i.e., above 180° F., and then add ice or cold water to cool down the dispersion, whereupon the cellulose ether goes slowly into solution during the cooling. In the following description and claims, the terms "dry milk" and "dry milk products" are intended to include dry whole milk, dry skim milk, dry whey and combinations and equivalents thereof.

In accordance with one aspect of the present invention, a dried milk-alkyl ether of cellulose mixture is placed in solution in water. This solution is frozen and is used to take the place of the ice normally introduced for cooling during the grinding operation. Thus, a triple function is accomplished: The milk is introduced and homogeneously dispersed in the sausage emulsion, the non-ionic alkyl ether of cellulose is solubilized and introduced into the sausage emulsion, and the emulsion is cooled to the desired extent. If desired, the quantity of salt normally added to the meat emulsion is added to the milk-methyl cellulose solution prior to freezing and reduces the freezing temperature, thereby providing a colder ice and having a better effect of cooling the meat emulsion to which it is added.

In the incorporation of the non-ionic alkyl ether of cellulose into whole meat cuts, a solution of the cellulose ether is introduced in the same manner that curing solutions are injected. The methyl cellulose may be dissolved in part of the brine or pickle which is normally injected or pumped into the meat cuts for curing purposes prior to the cooking and smoking stage. Thus, a solution of a non-ionic alkyl ether of cellulose in suitable concentration may be incorporated through the same needles that are used for the arterial pumping of hams and for the injection of bacon slabs.

Thus, the injection apparatus may be connected with two tanks, one containing the usual brine or pickle solution, and the other containing methyl cellulose solution or milk-methyl cellulose solution. For example, after pumping the meat cuts with about 5 to 10% by weight of the brine in the usual manner, the tanks can be switched and about 1 to 5% of methyl cellulose solution added by further injection through the same needles. Alternatively, two different sets of needles can be provided. Part of the brine can be incorporated in the methyl cellulose solution, up to the tolerance of methyl cellulose for salt. Thus, methyl cellulose solutions of 2% concentration will tolerate from about 5 to 17% of sodium chloride without salting out the methyl cellulose. The salt tolerance is dependent upon the type and viscosity grade of methyl cellulose used. High gelling and low viscosity grades have higher salt tolerance than low gelling, high viscosity grades.

The advantages of utilizing solutions of non-ionic alkyl ethers of cellulose which have heat-reversible gel-forming properties in the preparation of shaped or portion-sized food particles of many different types have already been disclosed in my patents, Nos. 2,798,814 and 2,887,382, and copending applications, Ser. Nos. 17,742, filed March 28, 1960 and 21,103, filed April 11, 1960, now abandoned. In these patents and applications, it was disclosed that food particles could advantageously be bound together to form shaped products by virtue of the binding characteristics of the non-ionic alkyl ethers of cellulose, facilitated in some instances by a freezing operation. The present invention relates to conventional food products which would ordinarily require no additional food binder to hold the particles together. Thus, it is an entirely novel concept to utilize binding agents of any type in whole meat cuts. The non-ionic alkyl ethers of cellulose can be utilized because their solutions are fluid with low viscosity grades or in low concentrations at room temperature and below, whereas they begin to gel at elevated temperatures such as encountered in the cooking and smoking operations. Thus, it is quite feasible to incorporate a small amount of methyl cellulose in weak brines or pickles to be injected into the meat cuts, or to follow strong brine injection with an injection of methyl cellulose solution which advantageously may incorporate a part of the brine. The solution thus injected will penetrate the meat to substantially the same extent as with conventional brines, but during the cooking and smoking operation will thicken due to the gel formation of alkyl ether cellulose, so as to prevent excessive migration of fat and gelatin. For this reason, there is less shrinkage loss during the cooking and smoking operation, and formation of fat and gelatin pockets is avoided.

Likewise, in the processing of smoked products such as wieners, bolognas and the like, the solution of alkyl ethers of cellulose does not detract from the efficiency of any of the normal operations. A wiener emulsion, for example, incorporating a small amount of methyl cellulose solution seems to have a more slippery, viscous appearance, actually facilitating the extrusion operation into the casing. The wieners and bolognas, etc., during smoking, in conventional processes, are subjected to temperatures as high as about 165° F., that is, well above the gelation temperature of the methyl cellulose solution utilized. Accordingly, due to gel formation uniformly throughout the product, migration of fats and excessive rendering are found to be substantially eliminated, and the resulting products are substantially free of fat pockets which tend to collect between the casings and meat skin in the conventional operations.

The cellulose ethers contemplated by the invention are defined as water-soluble, non-ionic alkyl ethers of cellulose having the property of forming heat-reversible gels in solution. These cellulose ethers include ethyl cellulose, methyl cellulose, methylethyl cellulose, hydroxypropyl methyl cellulose, and hydroxyethyl celluose. Ionic cellulose ethers such as carboxymethyl cellulose, carboxymethyl hydroxyethyl cellulose and their salts, which do not have the property of forming gels in aqueous solution upon heating and which have entirely different properties with respect to solution-formation and the like, are excluded by this definition. Unlike solutions or other gel-forming materials such as gelatin, alginates, pectinates and the like, which provide harder gels as their temperature is lowered, solutions of the alkyl cellulose ethers contemplated by the invention remain fluid until frozen and do not begin gel formation until heated.

The cellulose methyl ethers marketed under the name of "Methocel" are suitable for the purposes of this invention. Chemically, "Methocel" is a long chain cellulose polymer having a methoxyl content of about 27.5 to 32%. The HG, or high gel grade of Methocel, is, chemically, a mixed hydroxypropyl methyl ether of cellulose. The HG products gel at higher temperatures and have higher salt tolerance than the U.S.P. grades. Thus, HG-65 indicates a high gel grade of methyl cellulose having a gelation temperature of 65° C. in 2% aqueous solution. A U.S.P. grade at the same viscosity and concentration gels at a temperature about 10 to 15° lower. Salt in the solution lowers gelation temperature in each instance. These non-ionic cellulose ethers will be generally referred to hereinafter as methyl cellulose.

Methyl cellulose products are commercially available in various grades, ranging in viscosity from 10 to 15,000 centipoises in 2% water solution at 68° F. Different viscosity grades may be used with different types of food products. It is possible to mix the various commercially available viscosity grades to obtain a specific desired viscosity. One skilled in the art, guided by the information herein, may readily determine the best grade and type of methyl cellulose for a particular type of food product and for a particular processing operation. The inherently different characteristics of the meats used in various sausage mixes makes it desirable to use different concentrations and viscosity grades of methyl cellulose for the different mixes. Thus, for a sausage mix high in pork, higher concentrations of methyl cellulose and higher viscosity grades may be desirable than for a substantial all-beef product. On the other hand, the high gelling and lower viscosity grades of methyl cellulose are preferable in pumping whole meat cuts.

The concentrations of methyl cellulose for the purposes of this invention, in general, may range from about 0.5% up to about 5%. This, too, depends to some extent upon the viscosity grade of methyl cellulose used. Thus, for a sausage mix, U.S.P. grade Methocel of 8000 cps. viscisity is quite satisfactory at 1.5%. U.S.P. grade Methocel of 4000 cps. may be utilized in a 2% concentration to provide approximately the same result. U.S.P. Methocel of 400 cps. would be utilized in about 4% concentration. Mixtures of the various viscosity grades may be utilized as desired; for example, a 4% solution of methyl cellulose can be prepared by utilizing equal parts by weight of U.S.P. Methocel 1000 cps. and U.S.P. Methocel 100 cps.

The addition of salt to the methyl cellulose solutions lowers the gel temperatures and, therefore, gel formation takes place early in the cooking and smoking operation. The gel temperature, however, is not lowered to such extent that the solution tends to gel before the products reach the cooking and smoking stage. Thus, the solutions remain quite fluid during the injection.

The ease with which methyl cellulose goes into solution when mixed with dried milk or dried whey powder makes a continuous operation feasible, and for this reason does not substantially affect the economy of the usual process. Thus, the desired amount of methyl cellulose can be mixed with the dry milk and this mixture metered into a flowing stream of water. Mixing can be effected by passing the resulting stream through a centrifugal pump and a short mixing pipe, then into a holding tank. Both the milk and methyl cellulose go almost instantly into solution. The milk has an additional advantage of preventing the foaming tendency of the alkyl ethers of cellulose. No antifoaming agents are necessary. From the holding tank, the solution of milk-methyl cellulose may be pumped into a continuous flake ice machine. The flake ice from this machine is introduced into the meat-grinding machine during the preparation of the frankfurter emulsion. Ordinarily up to about 10% by weight of ice based on the weight of the mixture is introduced. This 10% of frozen material in the present instance should carry the desired amount of milk solids ordinarily introduced into the emulsion.

The invention will be further understood from the following examples of practice:

*Example 1*

A cold methyl cellulose solution containing 2% U.S.P. Methocel 4000 cps. is added to a frankfurter emulsion in a grinding machine to the extent of 10% by weight based on the weight of the emulsion. Continued grinding disperses the solution completely in the emulsion, resulting in a viscous and slippery appearing mass. The emulsion is extruded into casings and smoked in a conventional smokehouse until the the internal temperature of the products reach approximately 150° F. The smoked products are very uniform in appearance, characterized by substantial absence of fat pockets between the casings and meat. Loss from inferior products is small. The products possess good keeping qualities.

*Example 2*

A methyl cellulose solution containing 2% of U.S.P. Methocel 100 cps. and 2% of HG–65 400 cps. is frozen in a flake ice machine. The frozen flakes are then added to a frankfurter emulsion in the quantity usually added as ice for cooling purposes, e.g., about 10% by weight based on the weight of the emulsion. By this means about 0.4% of methyl cellulose is incorporated in solution form in the emulsion. The emulsion is extruded in the casings and then smoked by the conventional process to an internal temperature of about 150° F. The cased product has excellent smoking properties, rendering and fat migration being substantially reduced. The smoke-shrink is less than with the conventional smoked products and upon storage of the smoked products in cold rooms over the period of a week end, it is found that storage shrink is substantially reduced with respect to the conventionally produced materials.

*Example 3*

For a 500-pound batch of frankfurter emulsion in a conventional process, 15 pounds of dry milk (skim, whole or whey) are first mixed with 1 pound of methyl cellulose (U.S.P. Methocel 4000 cps.). The homogeneous dried mixture is then added to sufficient cold water to produce 50 pounds of solution containing a concentration of 2% methyl cellulose. The milk-Methocel mixture goes almost instantaneously into solution in the cold water. The cold solution is then introduced into the grinding machine during the grinding of the meat material, whereupon cooling is effected and the milk component as well as the methyl cellulose solution is incorporated into the mixture. The emulsion is then extruded into the casings and the product smoked in the usual manner. Again, the product is characterized by less smoking shrinkage and by less rendering and fat migration.

If it is desired to use a 4% methyl cellulose solution of lower viscosity grade, 2 pounds of the methyl cellulose powder of the selected grade may be mixed with the 15 pounds of dry milk solids.

*Example 4*

A milk-Methocel mixture prepared as described in Example 3 is introduced into the cold water utilized to prepare ice for addition to the grinding machine during preparation of the frankfurter emulsion. The dried mixture goes almost instantaneously into solution, with very little agitation. The milk-Methocel solution is run through a flake ice machine for conversion into a frozen material. The freezing of the methyl cellulose solution increases the strength of the methyl cellulose gels formed from such solutions. The frozen, flaked material is added to the frankfurter emulsion in the usual manner that ice is employed during the cooling stage. The resulting emulsion containing milk and methyl cellulose solution intimately dispersed therein is extruded and smoked in the conventional smokehouse. Process shrink is reduced and a product of excellent quality is provided.

*Example 5*

The process of Example 4 is repeated except that the salt normally used in a batch of frankfurter emulsion is mixed with the dry milk and methyl cellulose powders. The resulting solution when fed to the flake ice machines freezes at a lower temperature and the resulting flakes have an added cooling effect on the emulsion. The resulting emulsion is cased and the cased products are smoked, as before, providing high quality products.

*Example 6*

A methyl cellulose solution having a concentration of 4% methyl cellulose by weight is prepared by dissolving Methocel HG-90 100 cps. in water. This solution is then mixed with a curing brine so as to provide an injectable curing solution containing 2% of methyl cellulose and salts in a concentration insufficient to salt out the methyl cellulose during the time period prior to injection in the meat. The resulting solution is used for injection of hams, picnics, bacon slabs, etc., in the usual manner, either by arterial injection, multiple needle injection, or both.

*Example 7*

A pickle solution for the pumping of hams, shoulders and the like, is prepared by dissolving in water the conventional ingredients, which may comprise sugar, sodium nitrite, potassium nitrate and sodium chloride, the salt concentration being from 15 to 18% by weight. A second solution is prepared by dissolving Methocel HG-90 400 cps. in water to produce a 2% solution. After the methyl cellulose solution has been prepared, part of the pickle solution is added until the salt concentration of the methyl cellulose solution is approximately 5%. The hams are then arterially injected by first injecting about 8% of the concentrated brine, followed by injecting about 2% by weight of the methyl cellulose-salt solution. After the hams have been pumped, they are processed in the usual manner by curing, followed by cooking and smoking. Due to the presence of the methyl cellulose solution within the meat, the cooking and smoking shrink is reduced and the products retain an attractive, plump appearance. The keeping qualities are not adversely affected.

*Example 8*

A pickle solution having approximately the same concentration as described in Example 7 is utilized to inject sides of bacon through a series of injection needles to the extent of 6 to 8% by weight of the solution based on the weight of the meat. Following the brine injection, an additional injection is made through the same needles but utilizing in this instance, about 2 to 4% based on the weight of the meat of a methyl cellulose-salt solution prepared as described in Example 6. The resulting sides of bacon are further cured in the usual manner and are then smoked. Again, a substantial reduction in shrinkage during the smoking is realized.

*Example 9*

In lieu of the methyl cellulose solution utilized in Examples 7 and 8, a methyl cellulose solution is prepared by homogeneously mixing 10 parts by weight of dry milk solids with 4 parts by weight of Methocel HG-90 100 cps. This mixture is then dissolved in cold water into which it goes into solution almost instantaneously. A 2% concentration with respect to the methyl cellulose is prepared. Part of the pickle solution is added to this solution, as before, in an amount up to the salt tolerance of the methyl cellulose, and this solution is used following the conventional injection with curing pickle to provide an additional 2% of solution in the meat cuts. The products are further cured and smoked, as before, and are found to have less shrinkage loss and to possess high quality.

It will be understood that methyl cellulose solution and milk-methyl cellulose solutions may be added in any desired quantity in the conventional sausage process in which ice is normally used for cooling, i.e., as a further additive rather than as a substitute for the ice. Also, the quantities of methyl cellulose and milk-methyl cellulose solutions injected into meat cuts can be varied widely to meet the requirements of the particular meat processer, the particular trade, or to comply with local regulations.

It will be understood that many variations of the foregoing examples may be used without departing from the spirit and scope of the invention as further set forth in the appended claims.

I claim:

1. A process for the production of smoked meat products, comprising incorporating up to about 10% by weight based on the weight of the meat of methyl cellulose solution in said products prior to smoking to reduce smoking and storage shrink and improve product characteristics and then smoking said products, whereby during the smoking operation gelation of the methyl cellulose solution retards fat migration and reduces shrinkage.

2. In a process for the production of cured and smoked whole meat cuts wherein said meat cuts are injected with a curing solution, the improvement comprising injecting up to about 10% by weight based on the weight of the meat of methyl cellulose solution in said meat cuts at the time of injecting said cuts with the curing solution whereby the product exhibits less shrinkage during the smoking operation.

3. The process of claim 2 wherein the methyl cellulose is in solution in the curing solution used to inject the meat cuts.

4. The process of claim 2 wherein the methyl cellulose solution is introduced by injection into the meat with a part of the curing solution.

5. The process of claim 2 wherein the methyl cellulose solution is a solution of methyl cellulose in reconstituted dry milk.

6. The process of claim 5 wherein the methyl cellulose solution is a solution of methyl cellulose in reconstituted whey.

7. The process of claim 2 wherein the methyl cellulose solution is a solution of methyl cellulose in a liquid selected from the group constituting of fresh whole milk, skim milk, and whey.

8. A process for the production of smoked sausage products, comprising incorporating up to 10% by weight of a methyl cellulose solution in the sausage mix during the grinding of the ingredients of said mix, forming said mix into sausage products and smoking said sausage products whereby during the smoking operation gelation of the methyl cellulose solution retards fat migration and reduces shrinkage.

9. The process of claim 8 wherein said sausage products are wieners and wherein a cold methyl cellulose solution is introduced into wiener emulsion during the grinding stage to facilitate cooling and to disperse the methyl cellulose solution throughout the product.

10. The process of claim 8 wherein said methyl cellulose solution is a solution of methyl cellulose in a reconstituted dry milk product.

11. In a process for the production of sausage products wherein ice is added in the grinding stage to prevent overheating of the sausage mixture, the improvement comprising the incorporation of methyl cellulose in the water used to provide said ice, and adding the resulting frozen material to the sausage mixture in an amount up to about 10% by weight with respect to the weight of said sausage mixture.

12. In a process for the production of sausage products wherein dry milk solids are added to a meat emulsion during the grinding stage, the improvement comprising homogeneously incorporating a small amount of methyl cellulose in said dry milk solids, dispersing the resulting mixture in water to reconstitute the milk solids and solubilize the methyl cellulose, and adding the resulting solution in an amount of up to about 10% by weight to said emulsion.

13. In a process for the production of sausage products wherein dried milk solids are added to a meat emulsion during the grinding stage, the improvement comprising mixing said dried milk solids with methyl cellulose, dispersing said mixture in an amount of water providing up to 10% by weight of the meat emulsion to reconstitute the milk solids and solubilize the methyl cellulose, freezing the solution into flakes and introducing the resulting flakes of frozen milk-methyl cellulose solution into the sausage emulsion.

14. The process of claim 13 wherein salt is added to the methyl cellulose-milk mixture in an amount to provide the salt content of the usual sausage mix and wherein the inclusion of the salt lowers the freezing temperature of the resulting solution so as to provide greater cooling effect upon the emulsion when the frozen flakes are added.

References Cited in the file of this patent

UNITED STATES PATENTS

| | | |
|---|---|---|
| 2,355,548 | Musher | Aug. 8, 1944 |
| 2,798,814 | Rivoche | July 9, 1957 |
| 2,887,382 | Rivoche | May 19, 1959 |